Oct. 24, 1933. B. P. JOHNSON 1,931,960
COMBINATION MULCHING, HARROWING, HOEING, AND ROLLING MACHINE
Filed Dec. 7, 1932 2 Sheets-Sheet 2
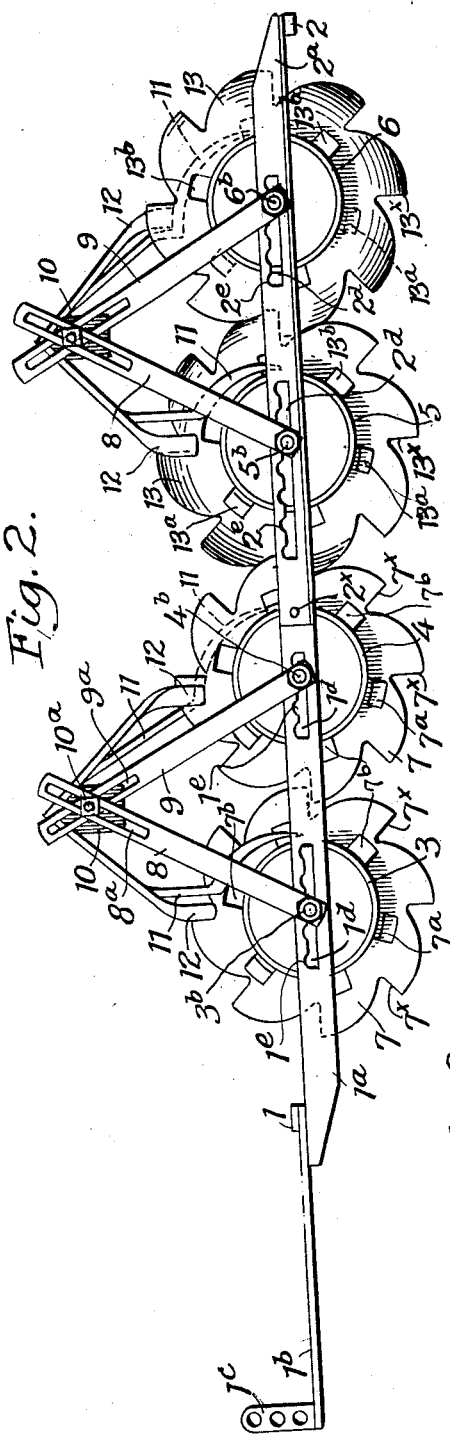
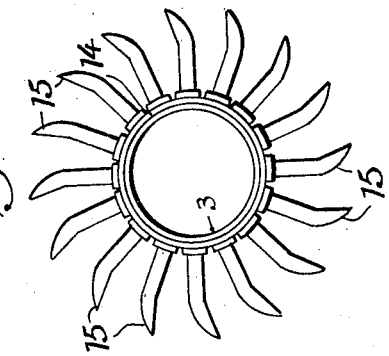
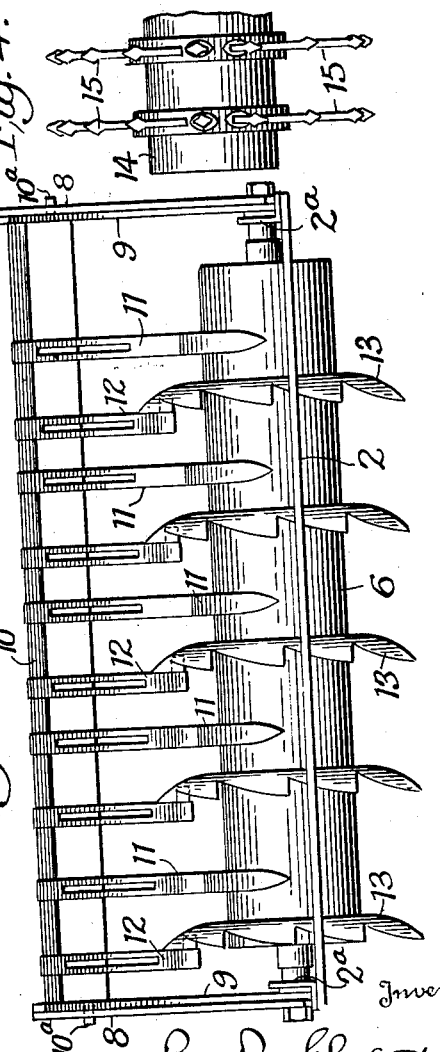

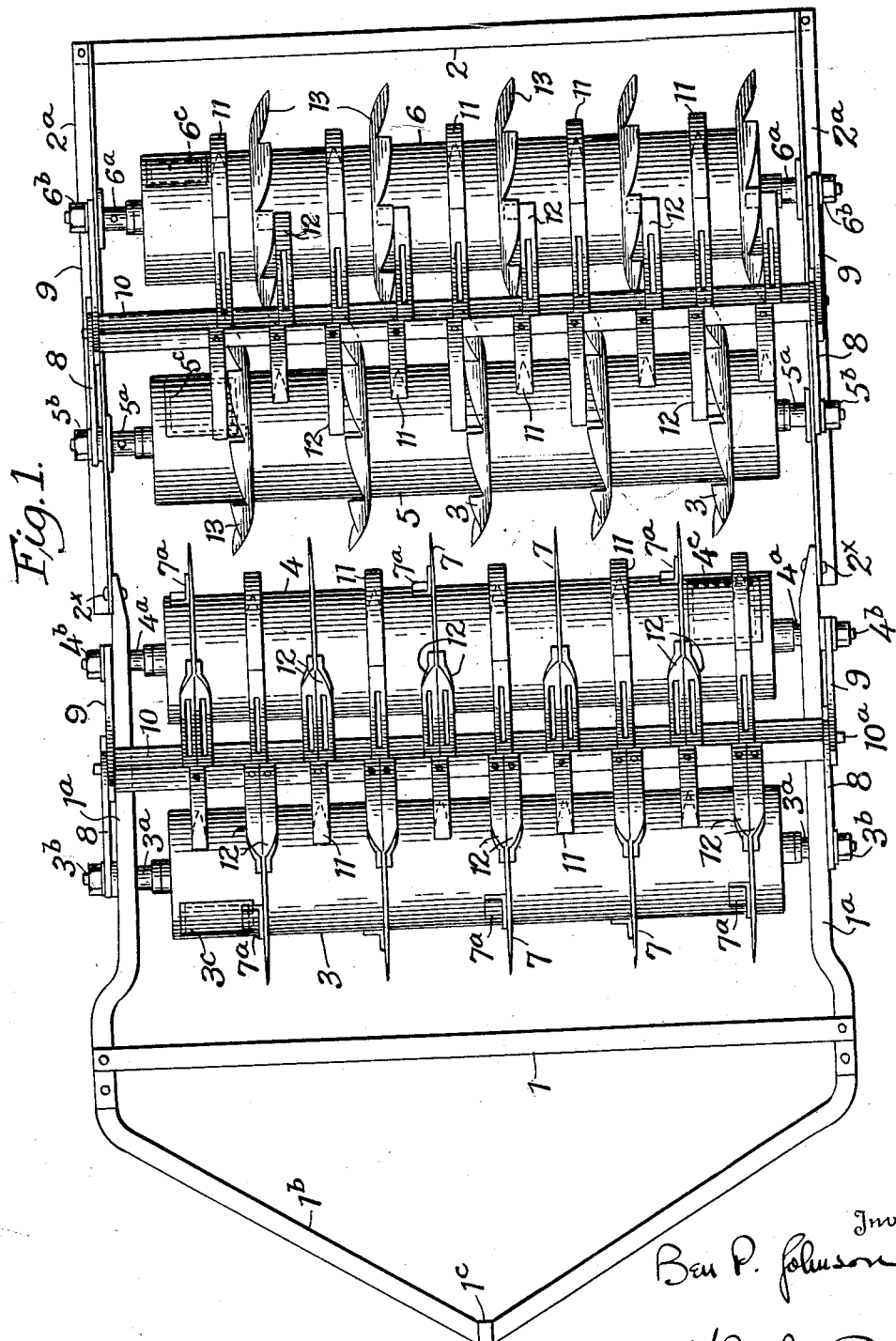

Patented Oct. 24, 1933

1,931,960

UNITED STATES PATENT OFFICE 1,931,960

COMBINATION MULCHING, HARROWING, HOEING AND ROLLING MACHINE

Ben P. Johnson, Springfield, Ohio, assignor to Edward E. Greiner, Springfield, Ohio Application December 7, 1932. Serial No. 646,181

20 Claims. (Cl. 55—11)

This invention is a novel combination mulching machine, rotary harrow, rotary hoe, and land roller; and the principal object of the invention is to provide a novel machine adapted to be readily converted to perform each of the above functions.

In those sections wherein the conservation of moisture is of importance, it is the usual practice to mulch the soil by plowing or harrowing after harvest to conserve the moisture. Wherever a so-called "combine" is used to harvest the grain the stubble is left in long lengths, and when plowed under the ends project setting up air pockets which admit warm air which penetrates below the soil causing the moisture to evaporate; and after thus plowing the moist earth from below is thrown on top resulting in the loss of moisture. These conditions can be overcome by the use of my combined machine such as hereinafter disclosed.

I will explain the invention with reference to the accompanying drawings which illustrate one practical embodiment thereof to enable others familiar with the art to adopt and use the same; and will summarize in the claims the novel features of construction, and novel combinations of parts, for which protection is desired.

In said drawings:—

Fig. 1 is a plan view of my combination machine, showing the coulter blades and harrow disks applied thereto.

Fig. 2 is a side elevation thereof.

Fig. 3 is a rear end elevation thereof.

Fig. 4 is an elevation showing a portion of the rotary hoe sleeve with the hoe tynes mounted thereon.

Fig. 5 is an end view of the rotary hoe sleeve showing same applied to the roller drum.

My novel machine preferably comprises a U-shaped front frame consisting of a base 1 and leg members 1a connected together. The ends of legs 1a adjacent the base 1 are connected to a V-shaped yoke 1b having a centrally disposed hitch 1c, said yoke extending in front of the base 1. In the legs 1a of the front frame are oppositely disposed slots 1d (Fig. 2) adapted to receive the journals of the two rollers 3 and 4 carried by the front frame.

Behind the front frame is a rear frame, of U-shaped plan, consisting of a base 2 and legs 2a which legs 2a are spaced slightly farther apart than the legs 1a and overlapping the latter; and the front and rear frames are hinged together by removable bolts 2x or the like extending through registering perforations in the outer ends of the legs. Legs 2a of the rear frame are likewise provided with oppositely disposed slots 2d (Fig. 2) receiving the journals of the two rollers 5 and 6 which are carried by the rear frame.

The two roller wheels 3 and 4 of the front frame consist of hollow steel tubes of substantial diameter closed at their ends and provided with journals 3a and 4a, respectively, adapted to enter the slots 1d in legs 1a, said rollers being secured in adjusted positions in the slots by means of nuts 3b, 4b threaded on the outer ends of the journals.

Preferably the upper edge of each slot 1d is notched or serrated as at 1e (Fig. 2) to assist in properly aligning the rollers 3 and 4 transversely of the frame, and in maintaining same in adjusted positions.

Rollers 5 and 6 of the rear frame are similar to rollers 3 and 4, and are journaled in slots 2d in the legs 2a of the rear frame, said rollers having journals 5a, 6a carrying nuts 5b, 6b. The slots 2d are likewise provided with notches or serrations 2e (Fig. 2) similar to and for the same purpose as notches 1e in the legs of the front frame.

In the rollers 3, 4, 5 and 6 are openings 3c, 4c, 5c and 6c, respectively, with removable cover plates disposed flush with the surface of the rollers, through which openings sand, earth, concrete, or any other heavy material may be introduced into the interior of the rollers to increase their weights to suit the character of the work and soil. The cover plates may be bolted, screwed or otherwise secured in place. This provision for increasing the dead weight of the rollers at the place of use, such as on a farm, is an important feature since the weight of the complete machine is of itself not sufficient to give proper penetration to the disks or the like which are mounted on the rollers; and this provision furthermore has the decided advantage of eliminating unnecessary freight charges since the shipping weight of the empty rollers is materially less than that of the rollers when weighted.

Upon each of the rollers 3 and 4 are mounted cut-away coulter disks 7, spaced about eight inches apart, said disks having cut-away portions 7x (Fig. 2) and being bolted or otherwise removably secured to clips 7a removably bolted to the peripheries of the rollers. Each coulter disk 7 has a central opening adapted to slip over the rollers 3 or 4, notches 7b (Fig. 2) being provided in the central openings of the disks of sufficient size to permit the disks 7 to be passed over the clips 7a when rotated into proper alignment therewith, whereby the disks 7 may be readily placed upon, or removed from the rollers 3 and 4, when the latter are removed from the frames, without having to first remove the clips 7a from the rollers.

Mounted upon the journals 3a, 4a at each end of rollers 3 and 4 are bars 8 and 9 connected at their upper ends by bolts 10a and to the ends of a transverse bar 10 disposed above the front frame, the bars 8 and 9 supporting bar 10 in elevated position. The upper ends of the bars 8 and 9 are provided with slots 8a and 9a (Fig. 2) respectively for the passage of the bolt 10a, the slotted connections of bars 8 and 9 to bar 10, and the slotted connections of the journals of rollers 3 and 4 to the legs 1a of the frame, permitting the rollers 3 and 4 to be adjusted forward and backward in the front frame.

Cooperating with opposite sides of each disk 7 are cleaning scrapers 12 mounted upon the cross-bar 10. Also upon the cross-bar 10 are supported, intermediate the disks 7, snakehead scrapers 11 for removing the packed soil in a coarse condition when the rear roller 4 is adjusted backwardly in the frame, thereby producing or resulting in a coarse dirt mulch. The scrapers 11 extend downwardly towards the rollers 3 and 4 and have their ends formed on the arc of a circle with their outer ends disposed adjacent the periphery of the rollers 3 and 4 as shown in Fig. 2.

When the machine is in motion the disks 7 cut through the surface litter and stubble and that portion of the stubble or surface that has been missed by the disks 7 on the front roller is rolled down and placed in a position to be cut by the disks 7 on the rear roller which are staggered with respect to the disks 7 on the front roller 3 of the front frame; or in position to be cut by the disks on the rear frame of the machine, hereinafter described.

The rear frame is likewise provided with the supporting bars 8 and 9 and with a cross-bar 10, in all respects similar to the corresponding members of the front frame. The disks 13 however on the rollers 5 and 6 of the rear frame are preferably concave (instead of flat) but have the cut-away portions 13x (Fig. 2) to aid penetration and to give greater traction. The object of using concave disks in the rear frame is to incorporate in the soil the surface litter as well as to cup the portion of the soil and stubble which has been missed by the disks on the front frame. The disks 13 are also mounted on their rollers 5 and 6 by the use of clips 13a, similar to the clips 7a on rollers 3 and 4 and are notched as at 13b to permit the disks to be slipped over the clips 13a.

The disks 13 are likewise provided with cleaning scrapers 12 mounted on the cross-bar 10; and with snake-head scrapers 11 for the rollers 5 and 6 intermediate the disks 13, similar to those of the front frame. To prevent side draft of the rear frame the concave disks 13 on the rear roller 6 are toed in a reverse direction to those on the front roller 5 as shown in Fig. 1.

To obtain a deeper cut with the concave disks 13, the rollers 5 and 6 on the rear frame may be adjusted angularly with respect to the axis of the frame by moving one end of the front roller 5 forward and the opposite end backward. The rear roller 6 can be similarly but reversely adjusted.

The disks 13 of the rollers of the rear frame should be staggered with respect to the coulter disks 7 of the front frame. For example, if the spacing between the disks 7 on roller 3 is eight inches the concave disks 13 of roller 5 should be disposed two inches to one side of the disks 7, and there being four rollers, the disks of rollers 4 and 6 should be staggered with respect to those of rollers 3 and 5, resulting in the assembly of disks operating on pitch lines two inches apart.

The machine as shown in Figs. 1 and 2 operates as a rotary harrow. To utilize the machine as a rotary hoe the rollers 3 to 6 inclusive are removed from their frames, and the disks 7 and 13 with their clips 7a and 13a removed. A rotary hoe sleeve 14 (Figs. 4 and 5) of slightly larger internal diameter than the exterior diameter of rollers 3 to 6, and carrying the rotary hoe tynes 15 may then be slipped over the rollers 3 to 6 and the rollers replaced in the frames; and when drawn over the surface of the land the hoe tynes 15 will effectively work the ground. Either the front frame alone, or the front frame with the rear frame attached thereto, may be utilized to form the rotary hoe.

When the disks 7 are mounted upon rollers 3 and 4 as shown in Fig. 1, all the disks will rotate in unison, and in order to increase the traction the disks are so disposed on each roller that the cut-away portions 7x will be staggered in relation to those of the other disks from end to end of the roller. When in motion the disks 7 on the rollers 3 and 4 of the front frame penetrate the soil which packs between the disks. This packed soil may be removed either as a coarse or fine mulch by the scrapers 11 and 12 as previously described.

Another method of removing the packed soil between the coulter disks 7 of the front frame is to adjust the rear roller 4 of the front frame forward or towards the roller 3 after first removing the snake-head scapers 11 from both rollers. In this position the disks of the rear roller 4 dislodge the soil, and due to speed and to the cut-away portion 7x, this adjustment will cause a fine dirt mulch to be deposited.

To utilize the machine as a land roller it is merely necessary to remove all disks 7 and 13 and their respective clips 7a and 13a from the rollers 3 to 6 inclusive, and to plug the bolt holes for the clips in the rollers, and when drawn over the land the weighted rollers 3 to 6 will effectively roll the ground.

I claim:—

1. In combination, a frame, a plurality of transversely disposed rollers journaled in said frame, means for adjusting the rollers in the frame relative to each other; struts mounted on the journals, the struts on adjacent journals converging upwardly and overlapping; cross-bars disposed between the overlapped struts; means adjustably connecting the overlapped struts and supporting the ends of the cross-bars; and scrapers mounted on the cross-bars engaging the rollers.

2. In a combination as set forth in claim 1, said frame being U-shaped, and a yoke connecting the legs of the frame in advance of the base, and a hitch at the center of the yoke.

3. In a combination as set forth in claim 1, said frame comprising opposed front and rear U-shaped members having their legs overlapping, and means pivotally connecting the overlapped end of the legs of said members.

4. In a combination as set forth in claim 1, said rollers each comprising hollow drums closed at their ends; journals extending from the ends of the drums; said drums having openings in their sides; and removable cover plates for the opening, said plates being inset flush with the peripheries of the drums.

5. In a combination as set forth in claim 1, said roller adjusting means comprising elongated slots in the frame receiving the journals of the rollers, and means for frictionally locking the journals in adjusted positions in the slots; said slots having a series of notches in their upper edges.

6. In a combination as set forth in claim 1, the overlapping ends of the struts having elongated slots therein, and said connecting means comprising bolts passing through the slotted portions of the overlapped struts and into the ends of the cross-bars.

7. In a combination as set forth in claim 1, a removable sleeve on each roller provided with hoe tynes.

8. In combination, a frame, a plurality of transversely disposed rollers journaled in said frame, means for adjusting the rollers in the frame relative to each other; a series of coulter disks mounted on each roller, the disks on the several rollers being staggered; struts mounted on the journals of the rollers, the struts on adjacent journals converging upwardly and overlapping; cross-bars disposed between the overlapped struts, means adjustably connecting the overlapped struts and supporting the ends of the cross-bars; and scrapers mounted on the cross-bars engaging the rollers and disks.

9. In a combination as set forth in claim 8, said frame being U-shaped, and a yoke connecting the legs of the frame in advance of the base, and a hitch at the center of the yoke.

10. In a combination as set forth in claim 8, said frame comprising opposed front and rear U-shaped members having their legs overlapping, said front member having a hitch adjacent the base, and means pivotally connecting the outer overlapped end of the legs of said members.

11. In a combination as set forth in claim 8, said rollers each comprising hollow drums closed at their ends; journals extending from the ends of the drums; said drums having openings in their sides; and removable cover plates for the openings, said plates being inset flush with the peripheries of the drums.

12. In a combination as set forth in claim 8, said roller adjusting means comprising elongated slots in the frame receiving the journals of the rollers, and means for frictionally locking the journals in adjusted position in the slots; said slots having a series of notches in their upper edges.

13. In a combination as set forth in claim 8, the overlapping ends of the struts having elongated slots therein, and said transfixing means comprising bolts passing through the slotted portions of the overlapped struts and into the cross-bars.

14. In a combination as set forth in claim 8, said disks having cut-away portions on their peripheries, the cut-away portions of the disks on each roller being staggered.

15. In a combination as set forth in claim 8, the disks having central openings slightly larger than the rollers; series of circumferentially disposed angular clips removably secured to the rollers and disks; and said disks having notches in their central openings conforming with the spacing of the clips for permitting the disks to be removed axially from the rollers when loosened from the clips and partially rotated without removing the clips from the rollers.

16. In a combination as set forth in claim 8, the disks on some of the rollers being concave; and the concave disks on adjacent rollers being reversely positioned to prevent side draft.

17. In combination, a frame comprising opposed front and rear U-shaped members with overlapping legs pivotally connected together, pairs of transversely disposed rollers journaled in said front and rear frame members respectively; means for adjusting the rollers in their frame members relative to each other; and a series of coulter disks mounted on each roller, the disks on the rollers being staggered.

18. In a combination as set forth in claim 17, said disks having cut-away portions on their peripheries, the cut-away portions of the disks on each roller being staggered.

19. In a combination as set forth in claim 17, the disks having central openings slightly larger than the rollers; series of circumferentially disposed angular clips removably secured to the rollers and disks; and said disks having notches in their central openings conforming with the spacing of the clips for permitting the disks to be removed axially from the rollers when loosened from the clips and partially rotated without removing the clips from the rollers.

20. In a combination as set forth in claim 17, the disks on some of the rollers being concave; and the concave disks on adjacent rollers being reversely positioned to prevent side draft.

BEN P. JOHNSON.